United States Patent
Donà et al.

(10) Patent No.: US 11,852,903 B2
(45) Date of Patent: Dec. 26, 2023

(54) EYEGLASSES WITH INTERCHANGEABLE LENSES

(71) Applicant: SAFILO—Società Azionaria Fabbrica Italiana Lavorazione Occhiali S.p.A., Padua (IT)

(72) Inventors: Cristian Donà, Padua (IT); Francesco Lazzaro, Padua (IT)

(73) Assignee: SAFILO SOCIETÀ AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 223 days.

(21) Appl. No.: 17/066,620

(22) Filed: Oct. 9, 2020

(65) Prior Publication Data

US 2022/0011592 A1    Jan. 13, 2022

(51) Int. Cl.
G02C 5/14      (2006.01)
G02C 1/08      (2006.01)

(52) U.S. Cl.
CPC .............. *G02C 5/146* (2013.01); *G02C 1/08* (2013.01); *G02C 2200/08* (2013.01)

(58) Field of Classification Search
CPC ........ G02C 1/08; G02C 2200/08; G02C 1/06; G02C 5/146
See application file for complete search history.

(56) References Cited

U.S. PATENT DOCUMENTS

| | | | |
|---|---|---|---|
| 2,350,338 A | 6/1944 | Casavant | |
| 2,350,388 A | 6/1944 | Claborn | |
| 2,749,800 A * | 6/1956 | Gagnon | G02C 11/02 351/97 |
| 2,754,724 A | 7/1956 | Fishman | |
| 2,781,693 A * | 2/1957 | Brumby | G02C 1/08 351/85 |
| 5,418,580 A * | 5/1995 | Sondrol | G02C 1/08 351/95 |
| 5,579,062 A * | 11/1996 | Sondrol | G02C 5/22 351/95 |
| 5,760,866 A * | 6/1998 | Wedeck | G02C 1/08 351/92 |

(Continued)

FOREIGN PATENT DOCUMENTS

| | | | | |
|---|---|---|---|---|
| GB | 694147 A | * | 7/1953 | |
| GB | 2199155 A | * | 6/1988 | ............... G02C 1/08 |

(Continued)

*Primary Examiner* — Christopher Stanford
(74) *Attorney, Agent, or Firm* — Volpe Koenig

(57) ABSTRACT

Eyeglasses include a front frame with a lens-holding rim having an upper rim portion and a lower rim portion which extend to surround the profile of a lens and have respective free ends facing each other in an opening area of the rim, an endpiece coupled rotatably to the lower rim portion about a first pivot axis and coupled rotatably to the upper rim portion about a second pivot axis, the first and second pivot axes being parallel to each other and the first pivot axis being laterally spaced from the second pivot axis on the side facing the rod, the endpiece being configured to rotate about the pivot axes between a closed and an open position of the rim, the endpiece and the upper rim portion cooperating mutually with each other in the closed position to hold the upper and lower rim portions therebetween.

11 Claims, 8 Drawing Sheets

(56) References Cited

U.S. PATENT DOCUMENTS

| | | | |
|---|---|---|---|
| 5,815,235 A * | 9/1998 | Runckel | A61F 9/027 351/86 |
| 6,273,564 B1 | 8/2001 | Wedeck et al. | |
| 6,854,845 B1 * | 2/2005 | Goldman | G02C 3/04 351/112 |
| 7,497,569 B2 * | 3/2009 | Webb | G02C 1/04 351/86 |
| 8,668,330 B2 * | 3/2014 | Reyes | A61F 9/025 351/110 |
| 9,632,330 B2 | 4/2017 | Damin et al. | |
| 9,696,561 B2 * | 7/2017 | Lin | G02C 1/10 |
| 11,460,715 B2 * | 10/2022 | Thorsell | G02C 1/08 |
| 2003/0048407 A1 | 3/2003 | Rivera | |
| 2014/0340627 A1 | 11/2014 | Li | |
| 2015/0370088 A1 | 12/2015 | Damin et al. | |

FOREIGN PATENT DOCUMENTS

| | | | | |
|---|---|---|---|---|
| GB | 2491210 A | * | 11/2012 | G02C 1/08 |
| KR | 20080101705 A | * | 11/2008 | |

* cited by examiner

EYEGLASSES WITH INTERCHANGEABLE LENSES

CROSS REFERENCE TO RELATED APPLICATIONS

This application claims the benefit of Italian Patent Application Number 102020000016537, filed Jul. 8, 2020, which is incorporated by reference as if fully set forth.

TECHNICAL FIELD

The present invention concerns eyeglasses with interchangeable lenses.

BACKGROUND

The invention relates to eyeglasses, whether they are fitted with graduated lenses for visual correction and/or designed for protective purposes, e.g. protection from sunlight, which are provided with a frame bearing interchangeable lenses.

In this specific field, eyeglasses are typically fitted with frames having lens-holding rims or hoops made with an open profile, wherein an upper rim portion and a lower rim portion have respective free ends facing each other at the interruption of the profile. For example, the profile may be interrupted at the side endpiece designed to connect the respective rod to the frame.

The advantage of this type of eyeglasses with interchangeable lenses is that of providing a system for closing the lens-holding rim as an alternative to the classic mechanism with the so-called threaded "tube" structure, wherein a clamping screw is used which is intended to bind together the pair of tubes, which are respectively connected to the corresponding rim portions.

Systems and mechanisms for closing the rim without the use of clamping screws have been proposed by the prior art, in order to make the operations of opening and closing the lens-holding rim easier, faster and more convenient for said user in order to insert or extract the lens, so as to facilitate the interchangeability of the lens while at the same time ensuring adequate retention of the lens in the lens-holding rim.

A first example of eyeglasses with the aforesaid properties is known from U.S. Pat. No. 2,350,338.

In the system described herein, the side endpiece, intended to connect the rod to the frame, is made integral with the lower portion of the lens-holding rim and said endpiece is connected to the upper rim portion by means of a dual-jointed arm with one of its ends hinged on the endpiece and the other end hinged on the upper portion of the lens-holding rim by means of an appendage protruding from the upper portion.

According to this configuration, the movement of the upper rim portion away from the lower portion, which movement is necessary for opening the rim, requires a combination of two successive movements, namely a first movement substantially translating the lower rim portion in a lateral direction with respect to the front frame, followed, once the arm is released, by a second movement of the lower portion directed vertically downwards, to reach the definitive spacing between the two rim portions.

This movement may be carried out by acting directly on the endpiece, but it does not appear to be obtainable by acting on the rod, since it is not possible to cause the necessary lateral movement of the upper rim portion, by manipulating the rod, as a first movement to open the rim. In the case of lightweight frames with particularly slender designs that have side endpieces of reduced size, using one's fingers to act on the endpiece having a reduced extension, that is on an only slightly extended grip or support area on said endpiece, may be inconvenient and rather difficult.

A second example of eyeglasses is described in U.S. Pat. No. 9,632,330.

In the system described herein, the side endpiece, intended for connecting the rod to the frame, is articulated to the upper portion of the lens-holding rim in a first joint and is articulated in a second joint to an arm which in turn is hinged to the lower rim portion. This articulation structure is configured in such a way that the endpiece, rotating about the hinge points, in one direction or in the opposite direction respectively, causes a corresponding approaching or distancing of the rim portions, so as to cause said rim to close or open.

Whilst this configuration allows the movement to be controlled when opening or closing the rim by acting on the rod, in particular lowering or raising the rod with respect to the front frame, it involves a certain structural complexity; in fact, it requires the presence of three pivot axes with just as many hinge pins interposed between the mutually articulated parts of the frame.

SUMMARY

A main object of the invention is to create eyeglasses with interchangeable lenses that are designed to overcome the functional limits and/or structural complexity highlighted with reference to known solutions, and in particular to allow the lens-holding rim to be opened or closed with a simple and fluid movement directly induced by moving the rod.

This object and others that will be more apparent hereinafter are achieved by eyeglasses made in accordance with the appended claims.

According to a first aspect of the invention, the eyeglasses comprise a front frame with a lens-holding rim having an open contour perimeter profile, said lens-holding rim including an upper rim portion and a lower rim portion which extend to surround the profile of a lens intended to be held on the lens-holding rim and which bear respective free ends facing each other in the opening area of the perimeter profile of the rim, and a side endpiece connecting a respective rod to the lens-holding rim, the endpiece being rotatably coupled to the lower portion of the lens-holding rim about a first pivot axis and being rotatably coupled to the upper portion of the lens-holding rim about a second pivot axis, the first and second pivot axes being parallel to one another and the first pivot axis being laterally spaced from the second pivot axis on the side facing the rod, the endpiece being thus configured to rotate about the pivot axes between a closed position and an open position of the lens-holding rim, in order to move the upper and lower rim portions closer together or further apart, respectively, at their respective free ends, retaining means and counter-retaining means being provided between the endpiece and the upper portion of the lens-holding rim, which means mutually cooperate with each other in the closed position to hold said upper and lower portions of the lens-holding rim therebetween.

According to one aspect of the invention, the lower portion of the lens-holding rim comprises, at the free end thereof, an appendage suitable for being housed in a first seat obtained in the endpiece, said appendage being rotatable in the first seat about the second pivot axis.

According to one aspect of the invention, the appendage is fork-shaped with a pair of arms hinged in the first seat about the first pivot axis.

According to one aspect of the invention, the eyeglasses comprise a rod-like element which is structurally independent from the endpiece and suitable for being made integral with the endpiece, the rod-like element extending internally in the first seat in a position interposed between the arms of the appendage and being coupled rotatably to said arms about the first pivot axis.

According to one aspect of the invention, the rod-like element extends externally to the first seat of the endpiece to a free end thereof housed in a second seat obtained in the upper portion of the lens-holding rim, said free end of the rod-like element being hinged in the second seat about the second pivot axis.

According to one aspect of the invention, the retaining means and counter-retaining means comprise a protuberance on one of either the endpiece or the upper rim portion and a respective recess on the other of either the endpiece or the upper rim portion, the protuberance being configured to engage the recess, with a substantial form fit, in the closed position, for the relative mutual retention between the upper and lower portions of the lens-holding rim.

According to one aspect of the invention, the recess is obtained in a lowered surface portion of the upper rim portion and the protuberance is provided in a portion of the endpiece suitable for being surface-coupled to said lowered portion.

According to one aspect of the invention, the recess is obtained in the upper portion of the lens-holding rim in a position above the second pivot axis.

According to one aspect of the invention, the recess is obtained on the inner side of the upper portion of the lens-holding rim, i.e. on the side facing the user's head when the eyeglasses are worn.

According to one aspect of the invention, the rod is connected to the endpiece in an articulated manner about a hinge axis.

According to one aspect of the invention, the second pivot axis is arranged, relative to the first pivot axis, opposite the hinge axis of the rod.

BRIEF DESCRIPTION OF THE DRAWINGS

Further features and advantages of the invention will be made clearer by the detailed description hereinafter of some of its preferred embodiments illustrated, by way of non-limiting example, with reference to the accompanying drawings, in which.

DETAILED DESCRIPTION OF THE PREFERRED EMBODIMENTS

Figure 1:
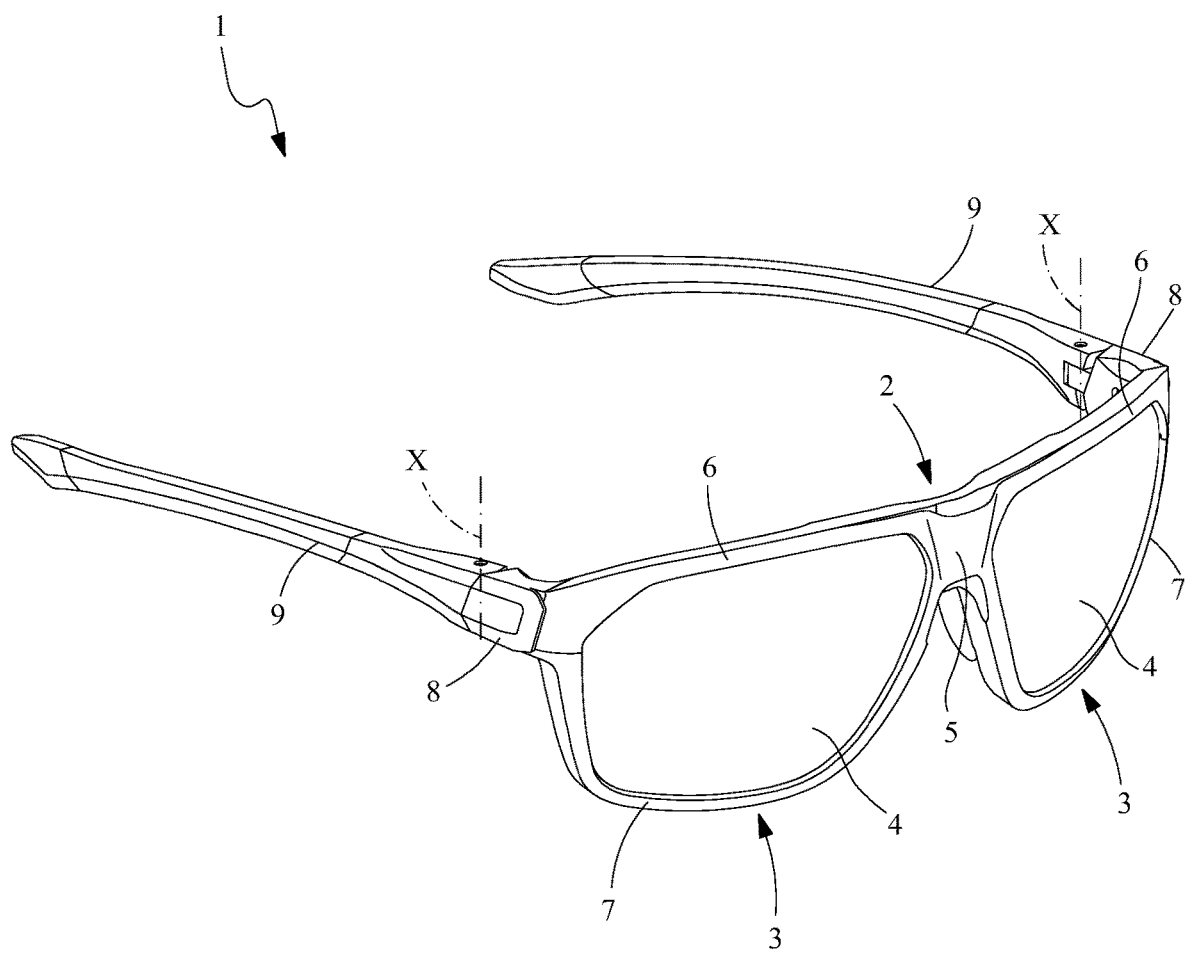
FIG. 1 is a perspective view of a first example of eyeglasses made according to the present invention.
Figure 2:
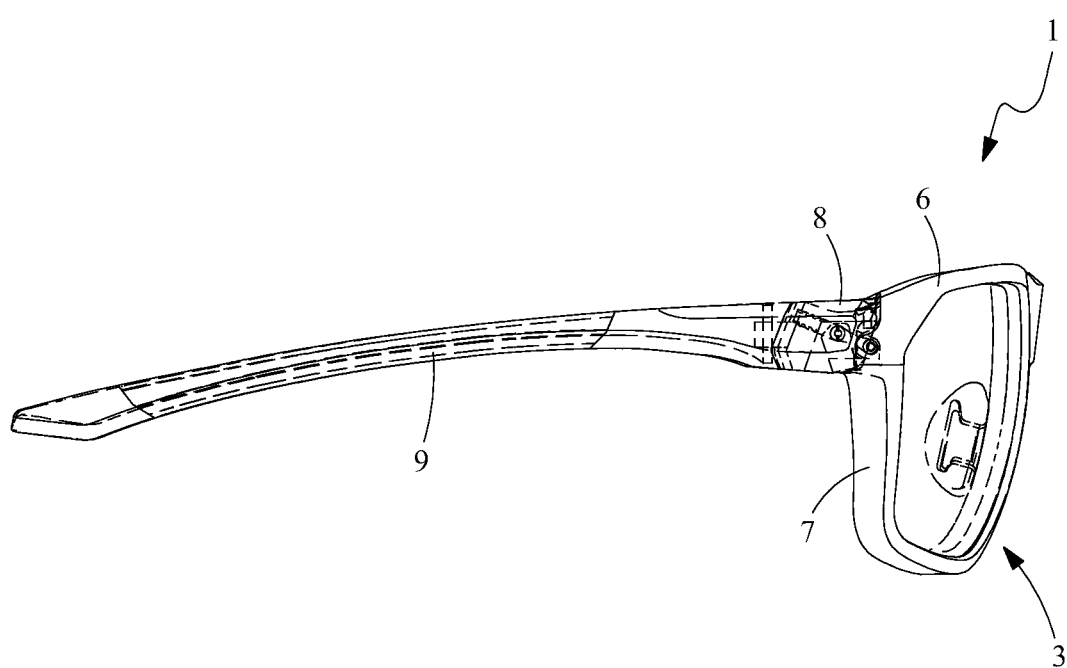
FIG. 2 is a side elevation view of the eyeglasses in FIG. 1.
Figure 3:
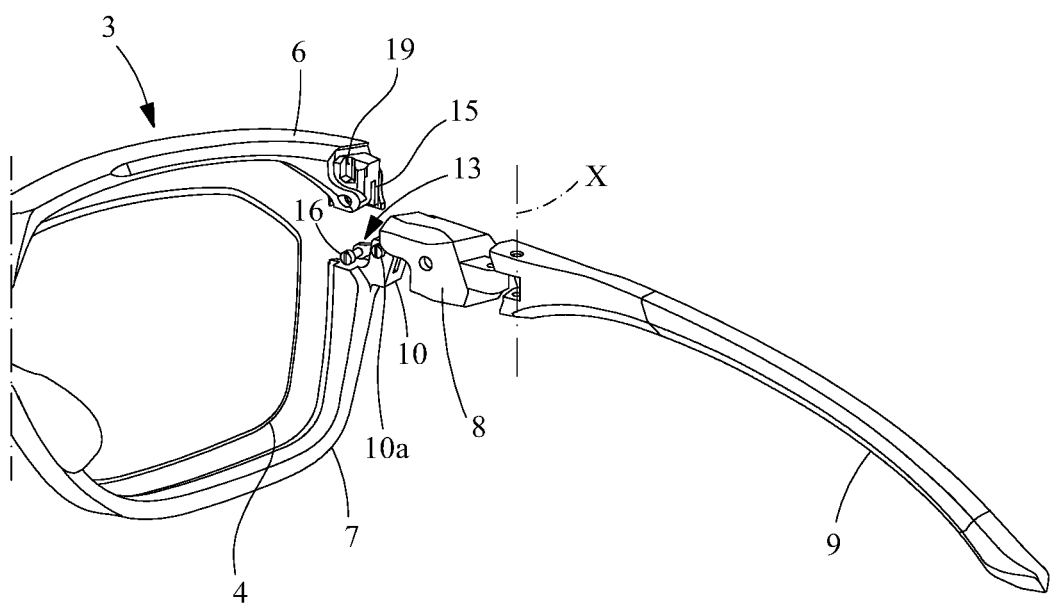
FIG. 3 is an enlarged, partial cross-sectional perspective view, with detached parts, of the eyeglasses of the preceding figures.
Figure 4:
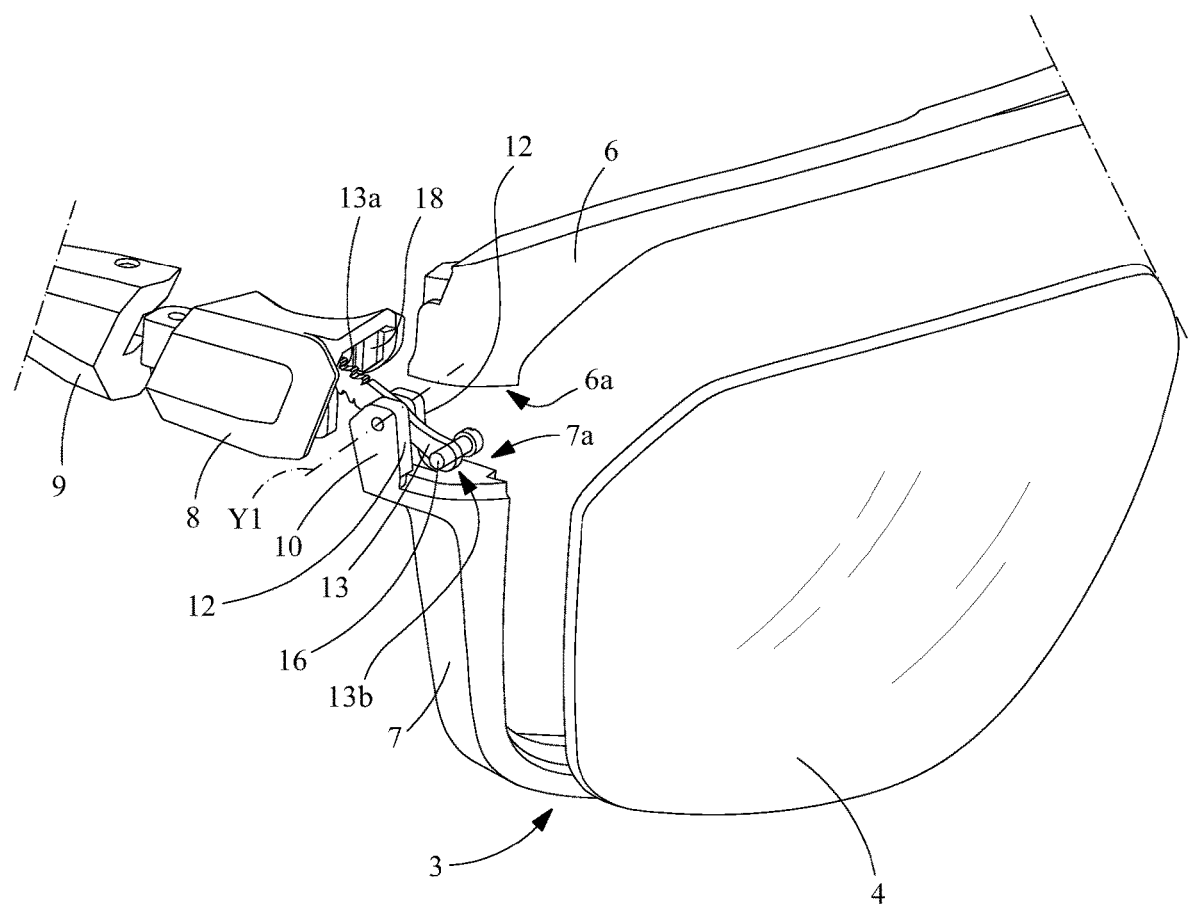
FIG. 4 is a perspective view, with detached parts, of a detail of the eyeglasses of the preceding figures.

With reference to the figures cited, eyeglasses with interchangeable lenses are indicated collectively with reference sign 1, which eyeglasses are made according to a first example of the present invention, comprising a front frame 2 with a pair of lens-holding rims 3, for the retention of respective lenses 4, which rims are connected by a central bridge 5 which extends in a nasal support area.

Each lens-holding rim 3 is designed to create the lens retention perimeter profile for each lens 4, wherein said perimeter profile has an open, selectively re-closable contour.

Because of the structural and functional similarity, only one of the lens-holding rims of the frame will be described in detail hereinafter. It is understood that similar construction details of each lens-holding rim, even if it has a symmetrical conformation, are marked, for ease of description, by the same reference signs.

Each lens-holding rim comprises an upper rim portion 6 extending substantially at the eyebrow arch and a lower rim portion 7 extending along the remaining part of the profile, said portions being developed to jointly surround the profile of the respective lens 4 intended to be held on the corresponding lens-holding rim and bearing respective free ends 6a, 7a facing one another in the opening area of the perimeter profile of the rim.

The eyeglasses further comprise, for each lens-holding rim, a respective side endpiece 8 connecting a respective side rod 9 (to support the eyeglasses on the head) to the corresponding lens-holding rim.

In the example described, the rod 9 is shown in an articulated coupling, about a hinge axis X, with the corresponding endpiece 8. Other variant embodiments are however possible; for example, it is possible to envisage eyeglasses wherein the rod 9 is rigidly connected to the corresponding endpiece 8, without any articulated connection. In this configuration the eyeglasses may expediently be made with side rods obtained in one piece with the respective side endpieces.

The endpiece 8 is coupled rotatably to the lower portion 7 of the lens-holding rim 3 about a first pivot axis, indicated with Y1, and is further coupled rotatably to the upper portion 6 of the lens-holding rim about a second pivot axis, indicated with Y2. These pivot axes Y1, Y2 are configured parallel to each other and the first pivot axis Y1 is laterally spaced from the second axis Y2 on the side facing the rod 6.

The endpiece 8 is configured to rotate about the pivot axes Y1, Y2, between a closed position and an open position of the lens-holding rim 3, in order to move the upper 6 and lower 7 rim portions respectively closer to each other or further apart from each other, at their respective free ends 6a, 7a.

In the closed position, the lens 4 is held firmly on the lens-holding rim, while in the open position the mutual spreading apart of the lower and upper portions allows the lens to be extracted and inserted relative to the rim.

The eyeglasses according to the invention further comprise retaining means and counter-retaining means arranged between the endpiece 8 and the upper portion 6 of the lens-holding rim, which means mutually cooperate with one another in the closed position in order to hold said upper and lower portions of the lens-holding rim therebetween, in the closed position.

In greater detail, the lower rim portion 7 comprises, at the free end 7a thereof, an appendage 10 which protrudes laterally from the rim profile and is configured to be housed in a first seat 11 obtained in the endpiece when the rim is in the closed position.

Said appendage 10 has a fork-shaped body bearing a pair of parallel arms 12 which are spaced apart and are hinged within the seat 11 about the first pivot axis Y1. For this purpose, the arms are provided with respective through holes which are coaxial with each other and suitable for engaging rotatably with a pivot pin 10a, in turn articulated in the seat 11 of the endpiece, by means of corresponding holes made in said endpiece.

A rod-like element is indicated with 13, which is structurally independent from the endpiece 8 and suitable for being made integral with said endpiece, for example by interlocking one end 13a of said element 13 in a respective blind cavity 8a obtained in the endpiece.

The rod-like element 13 is configured to extend, in part, internally in the seat 11, placing itself in a position interposed between the arms 12 of the fork-shaped appendage 10, to couple rotatably between said arms, about the first pivot axis Y1. The articulation is obtained by means of the rotatable engagement of the pin 10a that forms the pivot axis Y1 in a hole passing through the rod-like element 13.

Said element 13 extends further outside the seat 11, beyond the pivot point about the axis Y1, to a free end zone 13b which is suitable for being housed in a second seat 15 obtained in the upper rim portion 6. Said end 13b of the element 13 is hinged with the portion 6, within said seat, about the second pivot axis Y2. For this purpose, an articulation pin 16 is provided which is rotatably coupled into a hole 13c passing through the end 13b and rotatably housed in a pair of coaxial holes provided inside the seat 15.

The rod-like element 13 is hinged about the first pivot axis Y1, in a position interposed between the opposite ends 13a and 13b thereof, the configuration and relative position of the element 13 with respect to the pivot points about the axes Y1 and Y2 determining the oscillating movement of the endpiece (and the rod integral therewith) with respect to the rim portions 6, 7, between the open and closed positions mentioned above.

Figure 5:
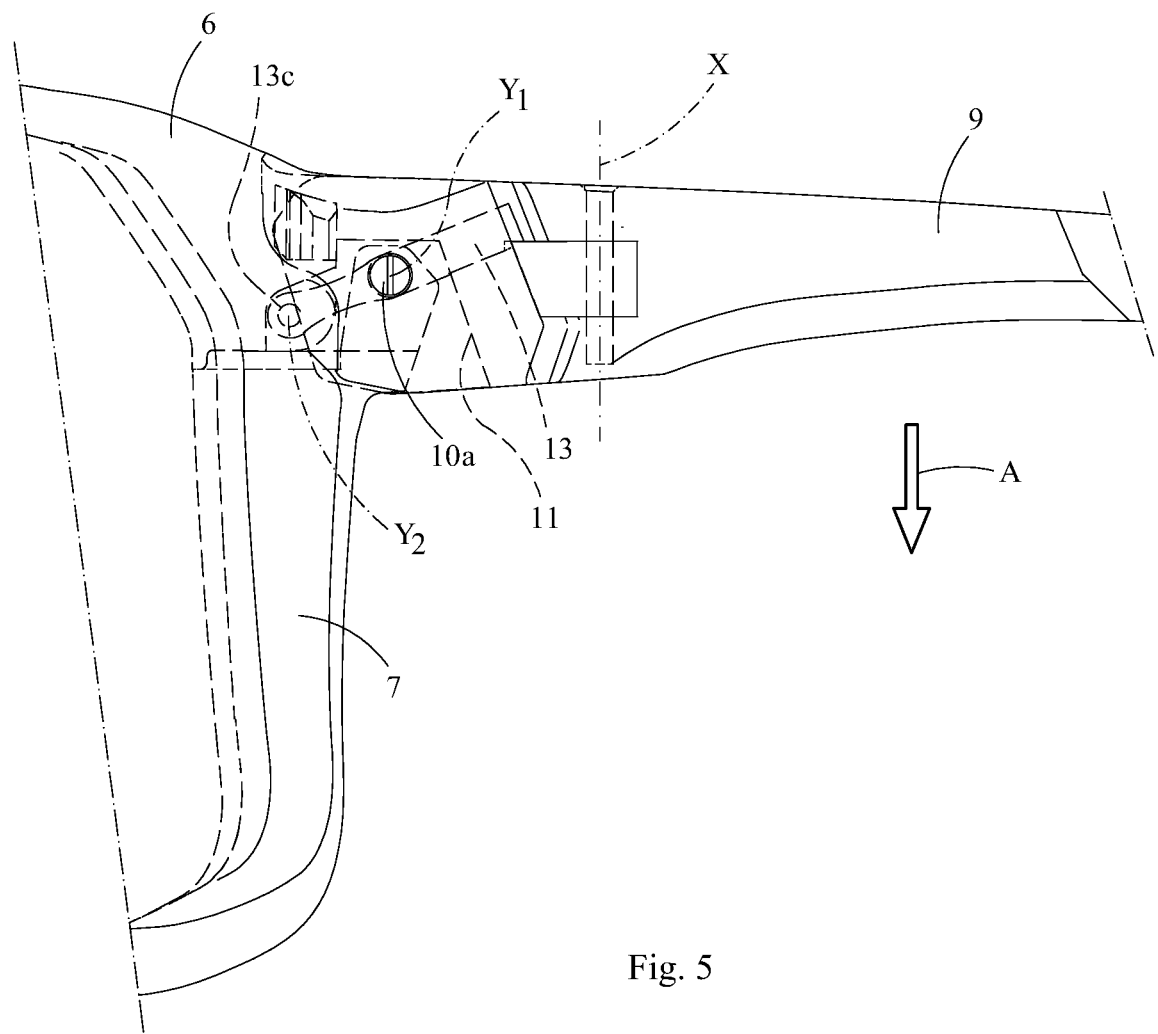
FIGS. 5 and 6 are enlarged, partial side elevation views of a detail of the eyeglasses of the preceding figures, shown in their respective and distinct operative positions.

FIG. 5 illustrates the closed position of the rim, wherein the lower and upper portions have their respective ends 6a, 7a pressed against one another, this configuration being suitable for holding the lens inside the lens-holding rim.

Figure 6:
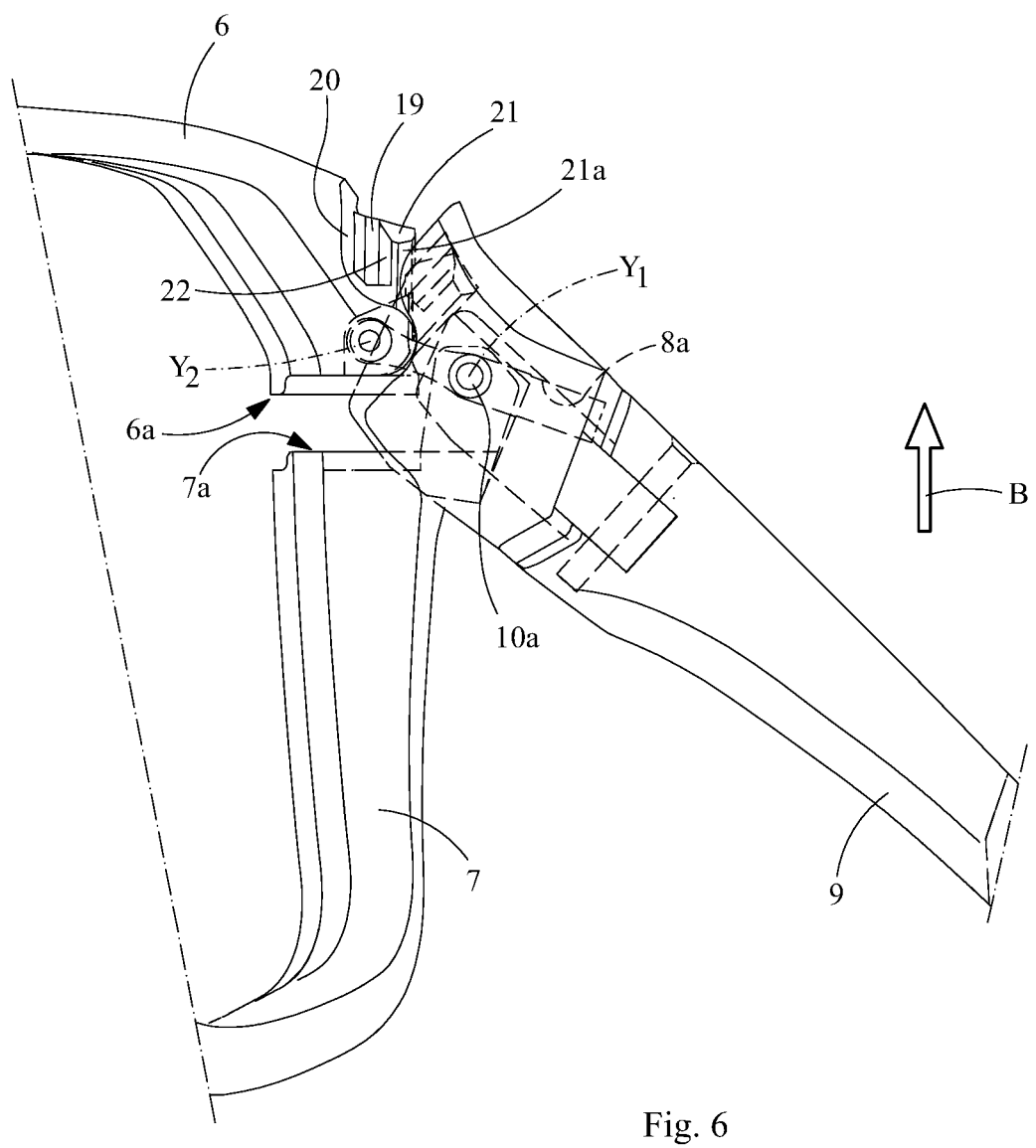
Figure 7:
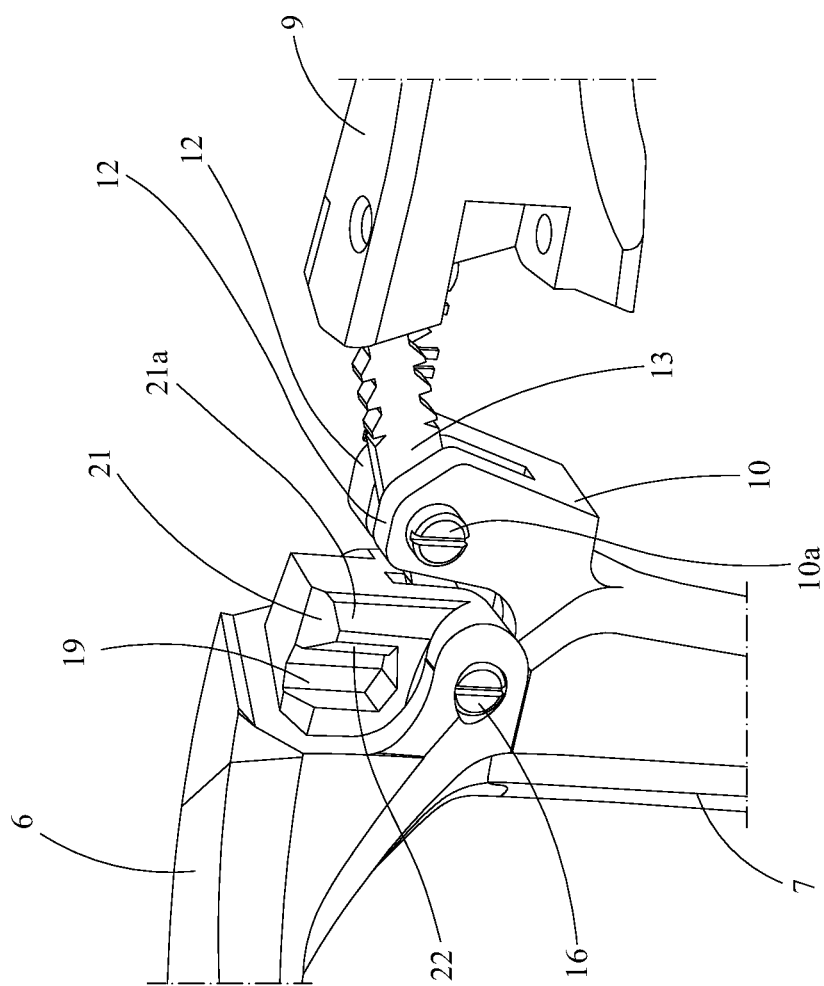
FIG. 7 is an enlarged, partial perspective view of a detail of the preceding figures.

FIG. 6 illustrates the open position of the rim, following the oscillating movement of the endpiece 8 about the pivot axes Y1, Y2, wherein the ends 6a, 7a of the respective portions are moved away from one another to the maximum relative distance, this configuration being suitable for allowing the extraction of the lens from the rim (with possible subsequent insertion of a new lens in the rim in case of replacement).

It should be noted that the rotary movement of the endpiece about the pivot axes may also be easily conducted by acting on the side rod 9 (preferably when oscillated with respect to the front frame when opening), the rod thus acting as leverage suitable for inducing and transmitting the rotation of the endpiece.

With reference to FIG. 6, by moving the rod 9 with a downward rotary movement (in the direction of the arrow A in FIG. 5), the oscillation of the endpiece in the direction of the open position (FIG. 6) is easily and conveniently induced, and conversely, by lifting the lever upwards starting from the open position (in the direction of the arrow B in FIG. 6), the closed position is easily reached.

It should be noted that, in the open position, the condition of maximum relative distance between the ends 6a, 7a is reached when the rear sides of the arms 12 of the fork-shaped appendage 10 are in contact with the inner walls of the seat 11. In other words, the abutment between the arms 12 and the inner walls of the seat 11 on which they abut, respectively, determines the "end of stroke." It follows that the choice of geometry, in particular the inclination, of the inner walls of the seat 11 helps to determine the maximum spread allowed to the lower rim portion relative to the upper rim portion.

In order to ensure the relative retention between the lower and upper rim portions in the closed position, the retaining means and counter-retaining means comprise a protuberance 18 on one of either the endpiece or the upper rim portion and a respective recess 19 on the other of either the endpiece or the upper rim portion, the protuberance 18 being configured to engage the recess 19, with a substantial form fit, in the closed position, for the relative mutual retention between said upper and lower portions of the lens-holding rim.

In the example described, the recess 19 is obtained in a lowered surface portion 20 of the upper rim portion 6, and the protuberance 18 is provided in a portion of the endpiece 8 suitable for being surface-coupled to said lowered portion. More specifically, the recess 19 is obtained in the upper portion 6 in a position above the second pivot axis Y2, as clearly shown, for example, in FIGS. 5 and 6.

Moreover, the recess 19 is obtained on the inner side of the upper rim portion 6, i.e. on the side facing the user's head when the eyeglasses are worn.

The recess 19 and the protuberance 18 are configured in such a way that the mutual coupling is obtained following a movement (during the rotation of the endpiece) that leads the protuberance to pass over (with relative surface sliding) a wall 21 of the portion 6, which wall is suitably shaped, due to an overall resilient deformation of the parts in mutual surface contact. Once it has passed over the wall 21, the protuberance 18 is housed in the recess, within which an inner surface 22 of said recess serves as an abutment for said protuberance, ensuring the retention of the protuberance inside the recess.

For disengagement, with a reverse rotary movement, the protuberance 18 is disengaged from the recess 19 in a similar way by passing over the wall 21, due to a resilient deformation of the parts in surface contact, until the protuberance is brought into the condition in which it is completely extracted from the recess.

To guide the coupling movement of the protuberance into the recess, the wall 21 is shaped with an inclined outer surface 21a to facilitate the movement in the sliding contact with the protuberance 18. In a similar way, the surface 22 of the recess is shaped with a predetermined inclination, aimed to facilitate the disengagement of the protuberance, while ensuring the retention of said protuberance in the closed position.

Figure 8:
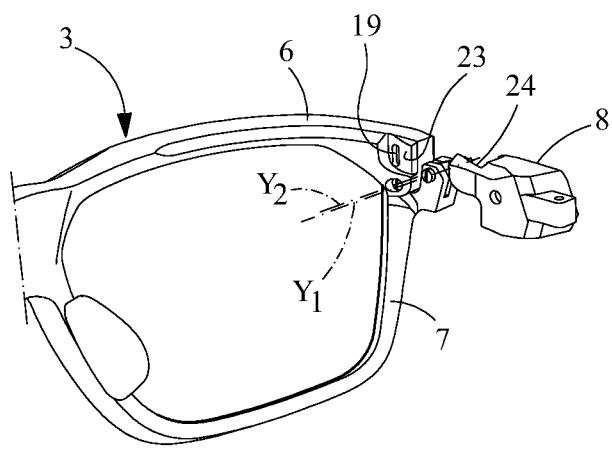
FIGS. 8 and 9 are partial perspective views, with detached parts, of a variant embodiment of a detail of the eyeglasses according to the invention.
Figure 9:
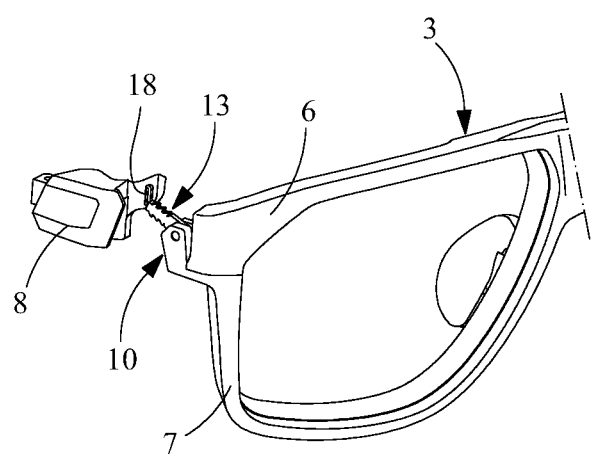

In a variant embodiment (FIGS. 8 and 9), the recess 19 is configured as a blind cavity with a slotted profile, with the protuberance 18 provided on a portion of the endpiece being shaped in a corresponding manner. Also, in this case there are inclined surfaces 23, 24 provided which are suitable for mutual surface overlapping and are obtained respectively on the upper portion 6 and on the endpiece 8.

An advantageous aspect of this invention lies in the fact that the operation of opening and closing the lens-holding rim may take place by means of the movement imposed on the rod, and the rod offers extended gripping surfaces for the user who may then also choose the most suitable lever arm on the rod to drive the rotary movement about the joints.

The configuration of the joints is further designed in such a way that by simply moving the rod downwards in the case of opening (i.e. towards the space underlying the frame), such a movement translates directly into the opening of the rim with the lower portion moving away from the upper portion substantially along a vertical direction (see FIG. 6), thus making the movement direct and fluid when passing between the open and closed positions.

Moreover, due to the rod-like element connecting the joints of the mechanism, this element is designed to be structurally independent from the lens-holding rim and the endpiece of the frame, and it is possible to make such an element of a different material, e.g. metal, with respect to the materials used for the other parts of the frame, e.g. plastics, thus improving the strength characteristics in the area of articulation of the joints.

The provision of retaining means and counter-retaining means further ensures a relatively stable retention of the lower and upper rim portions in the closed position, without affecting the fluidity of the oscillating movement of the endpiece about the pivot axes.

The invention thus achieves the proposed objects by achieving the stated advantages over the known solutions.

What is claimed is:

1. Eyeglasses comprising: a front frame with a lens-holding rim (3) having an open contour perimeter profile, said lens-holding rim including an upper rim portion (6) and a lower rim portion (7) which extend to surround the profile of a lens (4) intended to be held on the lens-holding rim (3) and which bear respective free ends (6a, 7a) facing one another in the open area of the perimeter profile of the rim (3), an endpiece (8) connecting a respective rod (9) to the lens-holding rim (3), the endpiece (8) is coupled rotatably to the lower portion (7) of the lens-holding rim about a first pivot axis (Y1) and is coupled rotatably to the upper portion (6) of the lens-holding rim (3) about a second pivot axis (Y2), said first and second pivot axes (Y1, Y2) being parallel to one another and the first pivot axis (Y1) being laterally spaced from the second axis (Y2) on the side facing the rod (9), the endpiece (8) being thus configured to rotate about said first and second pivot axes (Y1, Y2) between a closed position and an open position of the lens-holding rim (3), in order, respectively, to move the upper (6) and lower (7) rim portions closer to each other or away from each other, at their respective free ends (6a, 7a), and retaining means and counter-retaining means between the side endpiece (8) and the upper portion (6) of the lens-holding rim, said retaining means and counter-retaining means cooperate with one another in the closed position in order to hold said upper and lower portions of the lens-holding rim (3) therebetween, said retaining means and counter-retaining means comprise a protuberance (18) on one of either the endpiece or the upper rim portion and a respective recess (19) on the other of either the endpiece or the upper rim portion, the protuberance (18) being configured to engage the recess (19), to fit substantially within the recess in the closed position, for the relative mutual retention between said upper (6) and lower (7) portions of the lens-holding rim (3).

2. The eyeglasses according to claim 1, wherein said lower portion (7) of the lens-holding rim (3) comprises, at the free end (7a) thereof, an appendage (10) configured to be housed in a first seat (11) located in the endpiece (8), said appendage (10) being rotatable in said first seat (11) about the second pivot axis (Y2).

3. The eyeglasses according to claim 2, wherein said appendage (10) is fork-shaped with a pair of arms (12) hinged in the first seat (11) about the first pivot axis (Y1).

4. The eyeglasses according to claim 3, comprising a rod-like element (13) which is structurally independent from the endpiece (8) and suitable for being made integral with the endpiece, said rod-like element (13) extending internally in the first seat (11) in a position interposed between the arms (12) of the appendage (10) and being rotatably coupled to said arms about the first pivot axis (Y1).

5. The eyeglasses according to claim 4, wherein said rod-like element (13) extends externally to the first seat (11) of the endpiece to a free end (13b) housed in a second seat (15) located in the upper portion (6) of the lens-holding rim (3), said free end (13b) of the rod-like element being hinged in the second seat (15) about the second pivot axis (Y2).

6. The eyeglasses according to claim 1, wherein said recess (19) is located in a lower surface portion (20) of the upper rim portion (6) and said protuberance (18) is provided in a portion of the endpiece suitable for being surface-coupled to said lowered portion.

7. The eyeglasses according to claim 6, wherein said recess (19) is located in the upper portion (6) of the lens-holding rim (3) in a position above the second pivot axis (Y2).

8. The eyeglasses according to claim 6, wherein said recess (19) is located on an inner side of the upper portion (6) of the lens-holding rim (3).

9. The eyeglasses according to claim 7, wherein said recess (19) is located on an inner side of the upper portion (6) of the lens-holding rim (3).

10. The eyeglasses according to claim 1, wherein the rod (9) is connected to the endpiece in an articulated manner about a hinge axis (X).

11. The eyeglasses according to claim 10, wherein the second pivot axis (Y2) is arranged, relative to the first pivot axis (Y1), opposite the hinge axis (X) of the rod.

* * * * *